United States Patent [19]

Hayashi et al.

[11] 4,206,166
[45] Jun. 3, 1980

[54] PROCESS OF PRODUCING POLYOLEFIN FOAM MOLDINGS

[75] Inventors: Tatsuo Hayashi, Nakatsugawa; Ryōichi Itō, Yokkaichi, both of Japan

[73] Assignees: Mitsubishi Petrochemical Co., Ltd., Tokyo; Daisen Industry and Co., Ltd., Nakatsugawa, both of Japan

[21] Appl. No.: 631,593

[22] Filed: Nov. 13, 1975

[30] Foreign Application Priority Data

Nov. 13, 1974 [JP] Japan .................... 49-130003

[51] Int. Cl.$^2$ .................................. B27J 5/00
[52] U.S. Cl. ........................................ 264/126
[58] Field of Search .................... 264/126, 142

[56] References Cited

U.S. PATENT DOCUMENTS

| | | | |
|---|---|---|---|
| 2,761,177 | 9/1956 | Walters | 264/126 |
| 3,255,286 | 6/1966 | Luc-Belmont | 264/126 |
| 3,280,237 | 10/1966 | Corbin et al. | 264/109 |

FOREIGN PATENT DOCUMENTS 1277161  6/1972  United Kingdom .

Primary Examiner—Donald J. Arnold
Assistant Examiner—James R. Hall
Attorney, Agent, or Firm—Sughrue, Rothwell, Mion, Zinn and Macpeak

[57] ABSTRACT

A polyolefin foam article having a smooth, lustrous skin is produced by packing small pieces of polyolefin foam in the cavity formed between a male mold and a female mold of a mold assembly. One of the molds has no perforations for the passage of vapor and the other of the molds has: (1) perforations for the passage of a vapor; and (ii) at least two chambers which divide the perforations for the passage of vapor into perforations which permit the entrance of steam into the cavity and perforations which permit the exit of steam carrying entrained air present in and between the small pieces of polyolefin foam from the cavity. After compressing the small pieces of polyolefin foam in the mold cavity, the small pieces of polyolefin foam are heated by introducing steam into the chambers of the molds in such a manner that the time of introduction of steam to at least one of the chambers of the mold having perforations for the passage of vapor is subsequent to the time of introduction of steam into the other chamber or chambers thereof. In this manner, prior to heating to fuse and weld the small pieces of polyolefin foam steam is at least once passed therethrough to entrain and remove air present in and between the small pieces of polyolefin foam.

5 Claims, 4 Drawing Figures

PROCESS OF PRODUCING POLYOLEFIN FOAM MOLDINGS

BACKGROUND OF THE INVENTION

1. FIELD OF THE INVENTION

The present invention relates to a process of producing polyolefin foams, more particularly, to a process of producing polyolefin foams of any desired shape having skins possessing excellent smoothness and luster.

2. DESCRIPTION OF THE PRIOR ART

It is known to produce polystyrene foam at a high foaming ratio by pre-expanding expandable polystyrene beads containing an organic foaming agent such as butane, pentane, dichlorodifluoroethane, etc., filling the cavity of a mold having perforations for vapor passage with the pre-expanded polystyrene beads thus formed, introducing steam into the mold to further expand the pre-expanded beads and at the same time to fuse the surface of the beads to weld them to each other, and then cool the expanded, welded beads.

However, in the case of producing foamed moldings of a polyolefin, such as low density polyethylene, high density polyethylene, ethylene-propylene copolymer, polypropylene, ethylene-acrylic acid copolymer, ethylene-vinyl acetate copolymer, etc., it is difficult to prepare pre-expanded beads of the polyolefin by impregnating the polyolefin with an organic solvent, and hence a process has been proposed in which a polyolefin having compounded therein a foaming agent which generates a gas upon decomposition (hereafter, such a foaming agent is called a "chemical foaming agent") and a cross-linking agent is extruded into a sheet at a temperature which activates the cross-linking agent without decomposing the foaming agent and, after cutting the sheet into the proper dimensions, the sheet is heated in a mold to a temperature which decomposes the foaming agent to form foamed moldings. Foamed articles having a complicated shape cannot be obtained by such a process, however.

The inventors of the present application previously discovered an improved process for producing polyolefin foams having any desired shape (British Pat. No. 1,277,161). By this process, a polyolefin foamed article is produced by placing small pieces of a polyolefin foam (each having a mean volume of less than 0.2 cc and containing cells of less than 0.5 mm in diameter) in a mold having perforations for vapor passage, the mold confining the small foam pieces but being permeable to vapor and liquid in an amount of 95 to 100% by volume of the volume of the mold in most cases or 100 to 150% by volume in the case of compressing the small pieces. Steam is then introduced in the mold to heat the small foam pieces to a temperature between the melting point of the polyolefin and a temperature 50° C. higher than the melting point, whereby the small foam pieces are welded to each other. This process is quite useful, but is accompanied by the problem that undesirable burrs are formed on the surface of the foamed article obtained at the portions positioned at the perforations of the mold. Further, even if the burrs are removed from the surface of the foamed article, marks remain on the surface of the article where burrs were removed, which reduces the commercial value of the article.

The reason for burr formation is that polyolefins are crystalline resins, and the melt viscosity of a polyolefin at molding is quite low, which is quite different from non-crystalline resins such as polystyrene, and molten polyolefin enters the vapor passage perforations of the mold during molding.

To prevent the formation of burrs, a process has been proposed in which small foam pieces are placed in a mold which has no perforations for the passage of vapor and then steam for heating is introduced into the steam chamber to weld the small foam pieces to each other. However, in such a process heating is insufficient, which makes it difficult to provide excellent foamed products.

SUMMARY OF THE INVENTION

An object of this invention is to provide an improved process for producing polyolefin foams which is not accompanied by the faults of the process of British Pat. No. 1,277,161.

A particular object of this invention is to provide a process of producing polyolefin foams suitable for use as building construction panels, drainboards, covers for baths, a top for a working table, etc., at least one surface of which has a skin possessing excellent smoothness and luster.

The present invention provides a process of producing polyolefin foams which comprises:

(1) filling small pieces of a polyolefin foam in the cavity formed between a male mold and a female mold in an amount of about 120 to about 200% the desired volume of the molded product (the volume of the cavity after compression of the molds); one of the molds having no perforations for vapor passage and the other mold having perforations for vapor passage and also having at least two chambers which are separated from each other and which receive steam to heat the polyolefin foam;

(2) compressing the foam pieces by applying pressure to the mold combination; and (3) heating the polyolefin foam pieces by introducing steam into the mold assembly to weld the foam pieces to each other, steam introduction being in such a manner that the introduction of steam into at least one chamber is postponed until after the introduction of steam in the other chamber or other chambers of the mold provided with perforations for the passage of vapor.

DESCRIPTION OF THE PREFERRED EMBODIMENTS

Figure 1:
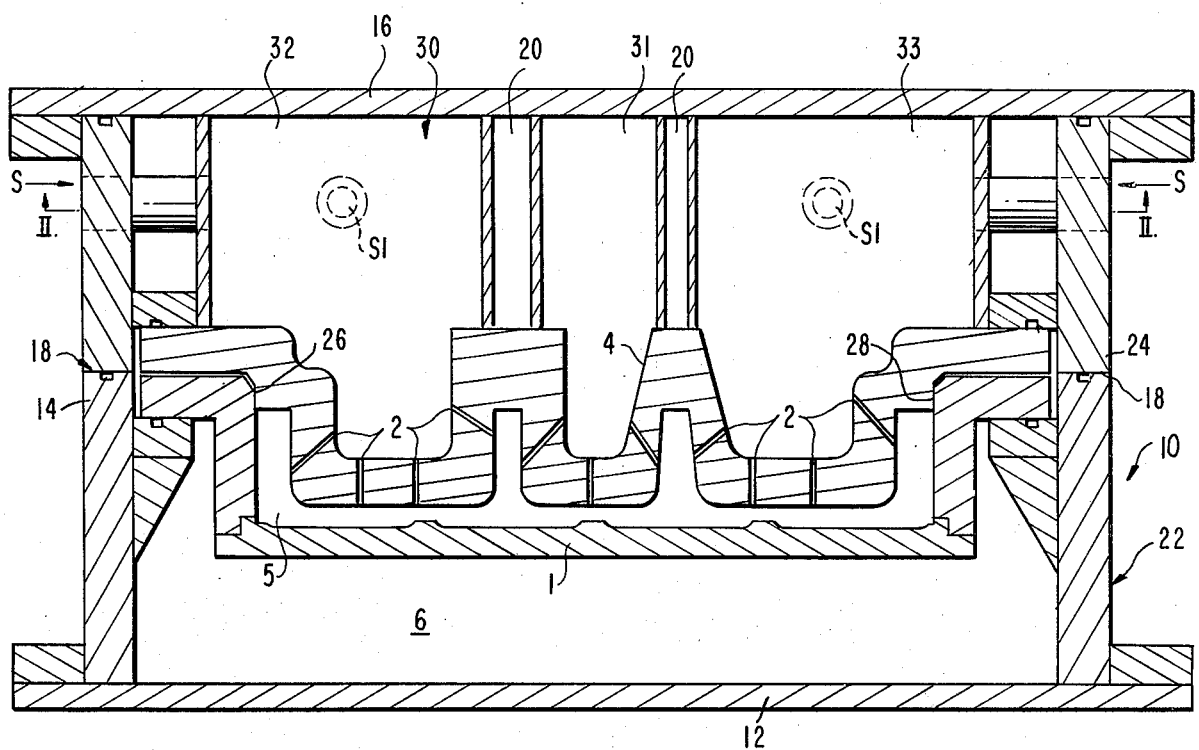
FIG. 1 is a sectional view of one embodiment of a mold assembly used in this invention.
Figure 2:
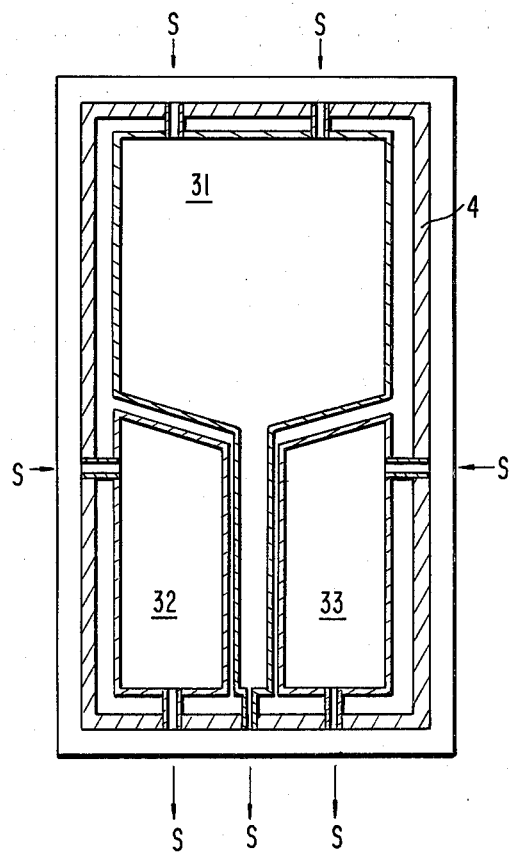
FIG. 2 is a reduced sectional view taken along line II—II of FIG. 1.

In the process of this invention, the small pieces of a polyolefin foam used have a mean volume of less than about 0.2 cc, a length of about 1 to about 15 mm, and contain cells of less than about 0.5 mm in size. They can be prepared by any conventional means, e.g., a conventional extrusion granulator. For example, the polyolefin foam can be prepared by melting and kneading a mixture of polyolefin and a foaming agent and other conventional additives, if desired, such as an auxiliary foaming agent, a nucleating agent, pigments, etc., at a temperature higher than the melting point of the polyolefin and the decomposition point of the foaming agent, and then extruding the mixture. It is preferred that the temperature employed be as low as possible in the above-described temperature range. The polyolefin foam thus prepared is cut into small pieces each having a volume of not over about 0.2 cc and a length of about 1 to about 15 mm in a conventional manner.

As the polyolefins used in this invention, there can be used high density polyethylene having a density of 0.935 to 0.975 g/cc; low density polyethylene having a density of 0.910 to 0.940 g/cc; a polar copolymer such as (a) a copolymer comprising ethylene and 5 mol% or less of a polar vinyl monomer (e.g., vinyl acetate, acrylic acid, methacrylic acid, acrylic acid esters in which the ester portion thereof has 1 to 7 carbon atoms, and methacrylic acid esters in which the ester portion thereof has 1 to 7 carbon atoms) and (b) a graft polyolefin in which 0.01 to 10 wt% of an unsaturated carboxylic acid (e.g., maleic anhydride, acrylic acid, methacrylic acid, etc.) is grafted onto a polyolefin; a non-polar copolymer such as a copolymer comprising ethylene and 10 mol% or less of an α-olefin (e.g., propylene, butene-1, pentene, etc.); and mixtures thereof, and the like. The above listing is illustrative only and should not be taken as limitative. The polyolefins may contain, if desired, a natural rubber, a butyl rubber, an ethylene-propylene rubber, a styrene-butadiene copolymer, polyisobutylene, polystyrene, an ABS resin, etc., generally in an amount of about 10 wt% or less, preferably 1 to 5 wt%.

Any conventional foaming agent can be used in the present invention, and the selection thereof merely involves conventional techniques. Examples of the foaming agent used in this invention are azodicarbonamide, dinitrosopentanmethyltetramine, benzenesulfonyl hydrazide, toluenesulfonyl hydrazide, 4,4'-oxybisbenzenesulfonyl hydrazide, diphenylsulfone-3,3'-disulfonyl hydrazide, barium azodicarboxylate, trihydrazinotriazine, 4,4'-oxybisbenzenesulfonyl semicarbazide, toluenesulfonyl semicarbazide, sodium bicarbonate, etc., which are decomposed upon heating to generate a foaming gas. The foaming agents may be used individually or as a mixture thereof. A suitable amount of the foaming agent used is generally about 0.3 to 2% by weight, preferably 0.5 to 1% by weight, based on the weight of the polyolefin used.

Furthermore, zinc oxide, calcium carbonate, magnesium oxide, zinc stearate, magnesium stearate, etc., may be added, if desired, to the polyolefin mixture as an auxiliary foaming agent to control the decomposition temperature of the foaming agent and as a nucleating agent to control the size of the cells formed in the polyolefin. A suitable amount of the auxiliary foaming agent used is generally about 0.3 to 2% by weight based on the polyolefin used. Also, pigments for coloring the product or additives to prevent the oxidation of the product may be further added to the mixture, if desired.

The molded foam produced by the molding process of this invention has formed thereon a high-density skin which differs from that obtained in the case of molding polystyrene foam. The thickness of the skin layer formed depends upon the thickness of the product. That is, the skin layer formed becomes thicker as the product is thicker. For example, a skin of about 1-2 mm thick is formed on the product of about 5 cm thick. The thickness of the skin layer formed varies depending upon the filling ratio of the polyolefin particles and the thickness of product prepared, but generally ranges from about 0.5 to about 3 mm. This is quite advantageous for use as light-weight structural materials.

The mold assembly for molding small pieces of polyolefin foam is composed of a male mold and a female mold, one of which has no perforations for the passage of vapor and the other of which has perforations for the passage of vapor, and the latter also has at least two chambers to receive steam, which chambers are separated or partitioned from each other. Small pieces of polyolefin foam are filled in the cavity formed between the male and female mold in an amount of about 120 to about 200% by volume of the final compressed volume of the cavity of the mold assembly, i.e., about 120 to about 200% by volume of the volume of the final molded product, and after compressing the small pieces of polyolefin foam by moving at least one mold, the small pieces of polyolefin foam are heated to a temperature between the melting point of the polyolefin and a temperature 50° C. higher than the melting point of the polyolefin to weld the small pieces of foam to each other.

The mold assemblies used in this invention will be described in more detail in the examples shown below.

In the drawings, similar numerals are utilized to identify like elements.

Referring initially to FIG. 1, there is shown a mold assembly in accordance with the present invention wherein numeral 10 designates the support structure for the male and female mold members comprising bottom portion 12, side walls generally indicated at 14 and upper portion 16. As will be appreciated by one skilled in the art, bottom portion 12 in combination with the lower portions of side walls 22 serves to confine steam in chamber 6, while top portion 16 in combination with the upper portion of side walls 24 serves to confine steam in chambers 32 and 33. Further shown in FIG. 1 is female mold 1 and male mold 4. When assembled, female mold 1 and male mold 4 enter into a sealing relationship as shown at 26 and 28 and form cavity. Male mold 4 can reciprocate vertically with respect to female mold 1 and such can be effected in a conventional manner, for example, by splitting the molds at junction 18, whereby the upper portion of side walls 14 (above the junction 18) can be reciprocated in a vertical plane.

Chamber 31 is also shown between chamber 32 and 33, separated therefrom by partitions 20.

Male mold 4 is shown provided with perforations 2 which permit contact between chamber 30 and cavity 5.

Finally, steam introduction and exit conducts S and S1 are shown (the steam may be introduced from left to right or right to left in FIG. 1 as desired). For the first steam introduction, conduits S1 are closed and steam flows from, e.g., left to right conduits S. For final heating, steam flow is primarily from conduct S to S1 (or vice versa) in each chamber. Steam conduits for chambers 6 and 31 are not shown.

It is to be noted in accordance with this invention that:

(i) either of the male or female molds has perforations for the passage of vapor;

(ii) both the male and female mold have at least one chamber;

(iii) the mold with the perforations for the passage of vapor must have at least two chambers which have perforations which contact the cavity;

(iv) the mold without the perforations could be partitioned, but there is no need for partitioning this mold.

The size of perforations in the mold is not overly critical, and for most commercial processes will generally be about 0.3 to about 1.5 mmφ, preferably 0.3 to 1 mmφ. The perforations need not be circular and can have many shapes, e.g., vent plugs which have a slit therein for vapor passage can also be used in this invention.

In the present invention, the mold having no perforations for the passage of vapor may be heated by a stream of heated gas, e.g., air, by electrical heating, or by steam, but the use of steam is desirable since in such a case the same heating means as is used to heat the mold having perforations for the passage of vapor can be employed and it is possible to easily control the temperature increase of both molds to prevent shrinkage of the product in the mold cavity.

At heating, the small pieces of polyolefin foam in the cavity of the mold assembly are heated to a temperature between the melting point of the polyolefin and a temperature of 50° C. higher than the melting point of the polyolefin by introducing steam into the partitioned chamber(s) of the mold having perforations for the passage of vapor; the time of introducing steam into at least one of the partitioned chambers is slightly postponed with respect to the time of introducing steam into the other chamber or chambers of the same mold. The time lag for introducing the steam into all chambers varies depending upon the size of product, but generally steam is not introduced into at least one chamber for from about 5 to about 40 seconds, preferably 10 to 20 seconds after.

Figure 4:
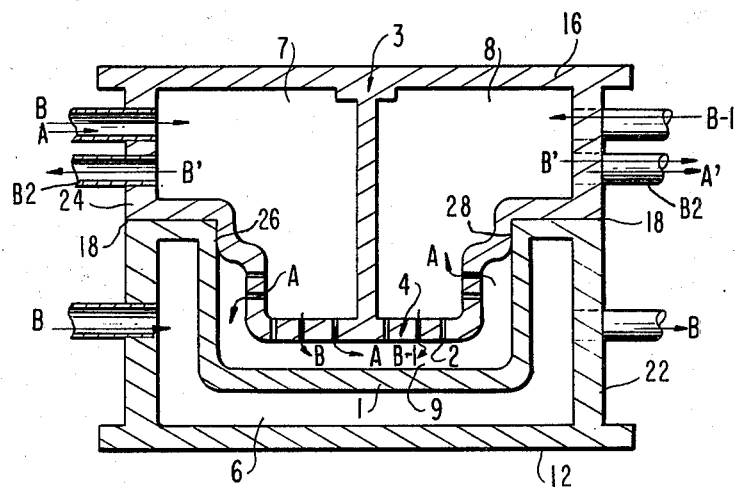
FIG. 4 is a sectional view of another embodiment of a mold assembly used in this invention.

For example, as will be described in Example 2, with the mold assembly as shown in FIG. 4, as shown by arrow A steam is first passed into a chamber 7 of male mold 4, thereafter passing through perforation 2 provided in the bottom of male mold 4 into cavity 9, out perforation 2 provided in chamber 8 and exiting from chamber 8 via the exit conduit as represented by arrow A'.

Then, after compressing the foam particles in chamber 9 by moving the mold, after a slight time lag steam is introduced into the chamber 7 as shown by arrow B and into chamber 8 as shown by arrow B1, B and B1 passing through perforations 2 at the bottom of both chambers. Steam exits, after performing its heating function, as shown by arrows B1 bypassing through steam exit ports provided in chambers 7 and 8. During the air-purging step, conduit B2 at chamber 7 is generally kept closed and conduit B2 at chamber 8 is generally kept opened.

The heating step of this invention may be carried out in such a manner that the mold assembly containing the small pieces of polyolefin foam is preheated to a temperature near the melting point of the polyolefin (the preheating is merely carried out to temperatures where the polyolefin does not melt, preferably to the softening point of the polyolefin used) by introducing steam for preheating into the partitioned chambers, interrupting the introduction of steam for preheating in at least one of the partitioned chambers of the mold having perforations for the passage of vapor while heating the other chamber or chambers by continuing the introduction of steam of a higher temperature than the steam for preheating, and then again introducing steam of a higher temperature into the at least one chamber where steam introduction was interrupted after a proper time lag.

The reason for introducing steam in at least one of the partitioned chambers of the mold having perforations for the passage of vapor after a time lag as compared with the time of introducing steam into the other partitioned chamber or chambers of the same mold assembly in this invention is as follows: in the case of making a large molded foam article, such as a building construction panel or a top for a work table, if steam is introduced simultaneously into all chambers, the air present in the spaces between the small pieces of polyolefin foam in the cavity cannot sufficiently escape and it remains in the cavity of the mold assembly. This results in voids in the product and spoils the appearance of the surface of the product. Thus, in the case of introducing steam into the partitioned chambers of the mold having perforations for the passage of vapor, the time of introducing steam into at least one of the partitioned chambers is postponed with respect to the time of introducing steam into other chamber or chambers of the mold having perforations for the passage of vapor to insure that air existing between or in the small pieces of polyolefin foam is displaced from the cavity of the mold assembly by the steam. For example, as shown by an arrow A in FIG. 4, steam first introduced into partitioned chamber 7 of the mold having perforations for the passage of vapor passes into the cavity 9, displaces the air present, and carries the air into partitioned chamber 8, whereby air existing in or between the small pieces of polyolefin foam is sufficiently removed from the cavity together with the steam when the steam is discharged from the system. In this case, the temperature difference between the partitioned chamber 7 in which the steam is first introduced and the partitioned chamber 8 from which the steam is discharged from the system is about 10° to 40° C. when the temperature of the steam used is about 140° C. Since it is not preferred to cause differences in the heat-bonding of the mass of the foamed polyolefin particles, it is not preferred that a great temperature difference occurs during the time lag step. The temperature difference is generally set within the range of about 5 to about 30° C., preferably 10° to 20° C., by controlling the temperature, the introduction pressure of the steam, the time of introducing steam into the chambers and the time lag. Based upon this consideration, the temperature range for steam is usually about 105° to about 160° C., preferably 110° to 145° C., while the temperature range for the preheating steam is preferably about 105° to 140° C.

The softening range of the polyolefin(s) used in the present invention is preferably in the temperature range from about 5 to about 40° C., most preferably 10° to 30° C., lower than the melting point of the polyolefin(s) used. Accordingly, this serves as a preferred preheating range in general.

It should be noted that the preheating of the present invention involves the introduction of steam to the chamber while it is in the "open" state, i.e., the mold assembly prior to any pressure application to the particle. On the other hand, the time lag referred to above means the time delay to the introduction of steam into the partitioned chamber when the mold assembly is in the closed state, i.e., when the foam polyolefin particles are compressed.

The exact degree of compression is not overly important, it merely being necessary that there is sufficient compression of the polyolefin foam particles so that they are brought into good contact for fusing and welding of the foam particles to each other. Usually, lesser compressions are used with foams of a high foaming degree, while higher pressures are used with not highly foamed polyolefins, in the latter case high pressures leading to good compaction.

The invention will be illustrated in more detail by the following non-limiting examples of preferred embodiments of the invention.

EXAMPLE 1

The apparatus of FIG. 1 was used in this example.

A mixture prepared by blending 100 parts by weight of pellets of high density polyethylene (made by Mitsubishi Petrochemical Co., Ltd., melt index 5; density 0.955), 0.7 part by weight of azodicarbonamide as a foaming agent, and 0.7 part by weight of zinc stearate as a nucleating agent in a ribbon-blender was extruded using an extruder having 50 mm die diameter at a temperature higher than the decomposition temperature of the azodicarbonamide (die temperature of 190° C.) to foam the polyethylene and then cut into small pieces 2 to 3 mm. in length. The density of the small pieces of foam was 0.418 g/cc.

The small pieces of foam were placed in a cavity 5 formed between a female mold 1 having no perforations for the passage of vapor and a male mould 4 having perforations 2 1.2 mm in diameter formed at 60 mm intervals from each other along the male mold 4. Chamber 3 for the receipt of steam is shown, which chamber is partitioned into three chambers 3', 3", and 3''' as shown in FIG. 1 by partitions 3A. Cavity 5 in the "open position" had a volume which was 165% of the volume of the product (the volume of cavity 5 in the "closed" or compressed condition). Steam at 110° C. was then introduced into chamber 6 of the female mold 1 (via means not shown) and into chambers 3', 3", and 3''' of male mold 4 to preheat the molds for 15 seconds until the temperature of both molds reached 100° C.

The supply of steam into the chambers 3" and 3''' was then stopped and male mold 4 was advanced 7 mm to compress the small pieces of polyolefin foam in the cavity 5. Thereafter, steam at 3.6 Kg/cm$^2$. and 140° C. was introduced into the chamber 6 of female mold 1 and into chamber 3' of male mold 4 to heat them for 15 seconds. In this case, the surface temperature of the polyolefin foam facing chamber 6 and chamber 3' was 138° C., while the surface temperature of the polyolefin foam facing chambers 3" and 3''' was 103° C. Substantially all air present in and between the small pieses of polyolefin foam was thus entrained by the steam and removed from the foam-containing chamber.

Thereafter, steam at 3.6 Kg/cm$^2$ and 140° C. was introduced into chambers 3" and 3''' of the male mold 4 for 25 seconds while continuing the introduction of steam into chambers 3' and 6 to complete heating.

After cooling the product for 2 seconds, the product was released from the mold assembly. A polyethylene foam article having a thickness of 12 mm, an area of 500×100 mm$^2$, a density of 0.52 g/cc, and a lustrous skin 2 mm thick was thus obtained.

COMPARISON EXAMPLE

Figure 3:
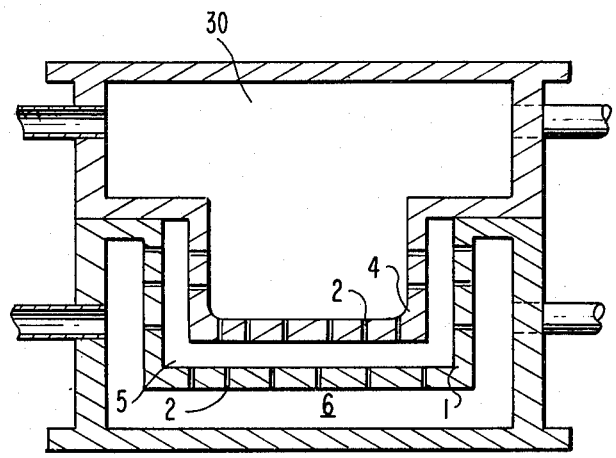
FIG. 3 is a sectional view of a conventional mold assembly for molding polystyrene foams.

In this comparison example, the apparatus of FIG. 3 was utilized.

Small pieces of polymer foam having a density of 0.418 g/cc prepared in the same manner as in Example 1 were placed in a cavity formed between a male mold 4 and a female mold 1 both of which had perforations 2 of the size and spacing of Example 1 for the passage of vapor as shown in FIG. 3 in an amount of 165% of the volume of the cavity, and then steam at 2 Kg/cm$^2$ and 110° C. was introduced into chambers 6 and 3 of the female mold and the male mold, respectively, to preheat the molds for 15 seconds. The male mold 4 was then advanced 7 mm to compress the small pieces of foam, and steam at 3.6 Kg/cm$^2$ and 139° C. was introduced in the chambers of both molds to heat them for 40 seconds. After cooling the product for 2 minutes, the product was released from the mold assembly.

The foam product obtained had many rod-like projections (burrs) 1.2 mm in diameter and about 5 to 15 mm in length due to the perforations, craters in some places on the surface thereof, and a density of 0.52 g/cc.

EXAMPLE 2

The apparatus of FIG. 4 was utilized in this example wherein like numerals to those of FIG. 1 are utilized to identify like elements.

Small pieces of high density polyethylene foam having a density of 0.485 g/cc prepared in the same manner as in Example 1 were filled in an amount as shown in Table 1 in the cavity formed between a female mold 1 having no perforations for the passage of vapor and a male mold 4 having perforation 2 for the passage of vapor 1.2 mm in diameter spaced at an interval of 60 mm from each other and partitioned chambers 7 and 8 to receive steam (or another heating medium or a cooling medium as desired).

Steam at 2 Kg/cm$^2$ and 110° C. was introduced into chamber 6 of the female mold 1 and into the two partitioned chambers 7 and 8 of the male mold 4 to preheat both molds for 15 seconds, whereafter the male mold 4 was advanced to compress the small pieces of foam as shown in Table 1. Thereafter, steam at 3.6 Kg/cm$^2$ and 139° C. was introduced into chamber 6 of the female mold 1 and also into the partitioned chamber 7 of the male mold 4 for 15 seconds. Substantially all air present in and between the small pieses of polyolefin foam was thus entrained by the steam and removed from the foam-containing chamber. Thereafter steam of the same pressure and temperature was also introduced into the other partitioned chamber 8 for 25 seconds to complete heating. The product formed was then cooled for 2 minutes and released from the mold assembly. The properties and the appearances of the foam products thus obtained are shown in Table 1.

Table 1

| Filling ratio* (%) | Density of product (g/cc) | Water content** (%) | Appearance |
| --- | --- | --- | --- |
| 100 | 0.28 | 25 | Crater pattern on the surface of the product. Molding insufficient. |
| 110 | 0.31 | 15 | Many pin holes on the surface |
| 120 | 0.36 | 15 | Smooth skin on the surface of the product |
| 140 | 0.44 | 10 | Smooth skin on the surface of the product |
| 160 | 0.52 | 9 | Smooth skin on the surface of the product |
| 200 | 0.68 | 9 | Smooth skin on the surface of the product |
| 220 | 0.76 | 7 | Smooth skin on the surface |

Table 1-continued

| Filling ratio* (%) | Density of product (g/cc) | Water content** (%) | Appearance of the product |
|---|---|---|---|

*filling ratio = $\dfrac{\text{Volume occupied by foamed polyolefin at filling}}{\text{Volume occupied by foamed polyolefin after compression}}$

**Water content = $\dfrac{\text{Amount of water contained in molded article}}{\text{Weight of molded article}}$ Since one of the male and female molds of the mold assembly used in this invention has no perforations for the passage of vapor, no burrs form on the surface of the product facing the mold having no perforations.

Also, since the molds are heated so air existing in or between the small pieces of polyolefin foam packed in the cavity of the mold assembly is removed therefrom as completely as possible by the steam for heating, a product having a lower internal porosity and high strength is obtained.

Furthermore, since the volume of the small pieces of polyolefin foam filled in the cavity of the mold assembly is greater than the volume of the final product (due to being compressed and molded therein), the polyolefin foam article obtained has a smooth, lustrous skin 1 to 2 mm thick.

While the invention has been described in detail and with reference to specific embodiments thereof, it will be apparent to one skilled in the art that various changes and modifications can be made therein without departing from the spirit and scope thereof:

What is claimed is:

1. A process of producing polyolefin foam molding which comprises:
   (1) filling pieces of polyolefin foam having a mean volume less than 0.2 cc and a length of about 1 to 15 mm in an adjustable cavity formed between the opposing faces of a male mold and a female mold in mating combination, the volume of said cavity being about 120 to about 200% of the volume of the molding desired; one of said molds having no perforations for the passage of vapor and the other of said molds having (i) perforations for the passage of vapor and (ii) at least two chambers for the receipt of steam which are disposed behind the face of the mold having perforations and in communication with a portion of said perforations;
   (2) compressing the pieces of polyolefin foam to the volume of the molding desired by moving one mold relative to the other to thereby reduce the volume of the cavity;
   (3) heating the foam pieces by introducing steam in the mold chambers to fuse the foam pieces to each other in such a manner that steam is introduced into one of said chambers in communication with said perforations prior to introducing steam to the other of said chamber or chambers in communication with said perforations whereby steam is permitted to enter and exit said cavity and displace air from in and between the pieces of polyolefin foam prior to the completion of heating;
   (4) terminating steam flow;
   (5) cooling the fused foam pieces; and
   (6) opening the molds and removing the fused foam pieces.

2. The process as claimed in claim 1, wherein said pieces of polyolefin foam have cells of less than about 0.5 mm in size.

3. The process as claimed in claim 1, wherein said male and female mold containing the pieces of polyolefin foam in the cavity thereof are preheated to the softening point of the polyolefin.

4. The process of claim 1 where in step (3) steam is introduced into one of said chambers in communication with said perforations 5 to 40 seconds before introducing steam to the other of said chamber or chambers in communication with said perforations.

5. The process of claim 1 where in step (3) steam is introduced into one of said chambers in communication with said perforations 10 to 20 seconds before introducing steam to the other of said chamber or chambers in communication with said perforations.

* * * * *